(12) United States Patent
Hahn et al.

(10) Patent No.: US 10,368,381 B2
(45) Date of Patent: Jul. 30, 2019

(54) METHOD FOR TERMINAL TO ESTABLISH MULTI-LINKS IN WIRELESS COMMUNICATION SYSTEM, AND APPARATUS THEREFOR

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 15/745,918

(22) PCT Filed: Jul. 27, 2015

(86) PCT No.: PCT/KR2015/007797
§ 371 (c)(1),
(2) Date: Jan. 18, 2018

(87) PCT Pub. No.: WO2017/018553
PCT Pub. Date: Feb. 2, 2017

(65) Prior Publication Data
US 2018/0199390 A1 Jul. 12, 2018

(51) Int. Cl.
*H04W 76/15* (2018.01)
*H04W 56/00* (2009.01)
(Continued)

(52) U.S. Cl.
CPC .......... *H04W 76/15* (2018.02); *H04B 7/2606* (2013.01); *H04W 56/0015* (2013.01);
(Continued)

(58) Field of Classification Search
CPC . H04W 76/15; H04W 56/0015; H04W 76/14; H04W 76/27; H04W 88/04; H04W 8/005; H04W 24/08; H04B 7/2606
See application file for complete search history.

(56) References Cited

U.S. PATENT DOCUMENTS

2014/0349694 A1\* 11/2014 Raghothaman ....... H04W 36/00
455/509
2015/0045033 A1\* 2/2015 Kim .................... H04B 7/15507
455/436
(Continued)

FOREIGN PATENT DOCUMENTS

KR 101054077 B1 8/2011
KR 101506295 B1 3/2015
(Continued)

*Primary Examiner* — Andrew Lai
*Assistant Examiner* — Harry H Kim
(74) *Attorney, Agent, or Firm* — Dentons US LLP

(57) ABSTRACT

A method for a terminal out of a coverage to establish multi-links via relay terminals in a wireless communication system, according to one embodiment of the present invention, comprises the steps of: sending an RRC connection request to a temporary relay terminal having the most excellent device to device (D2D) signal quality, among relay terminals located nearby the terminal; receiving, from the temporary relay terminal, an RRC connection setup indicative of a first base station to provide a substitution link, from among the base stations to which the relay terminals are connected; establishing the serving link via a first relay terminal by sending an RRC connection completion message to the first relay terminal connected to the first base station, from among the relay terminals; and establishing the substitution link in which unicast data transmission/reception is deactivated, via the second relay terminal connected to the second base station, from among the relay terminals.

15 Claims, 16 Drawing Sheets

(51) Int. Cl.
*H04W 76/14* (2018.01)
*H04W 76/27* (2018.01)
*H04W 88/04* (2009.01)
*H04W 8/00* (2009.01)
*H04W 24/08* (2009.01)
*H04B 7/26* (2006.01)

(52) U.S. Cl.
CPC ........... *H04W 76/14* (2018.02); *H04W 76/27* (2018.02); *H04W 88/04* (2013.01); *H04W 8/005* (2013.01); *H04W 24/08* (2013.01)

(56) References Cited

U.S. PATENT DOCUMENTS

2015/0350866 A1* 12/2015 Patil .................... H04W 40/244
370/254
2017/0150501 A1* 5/2017 Park ...................... H04L 1/1861

FOREIGN PATENT DOCUMENTS

| KR | 1020150022240 A | 3/2015 |
| KR | 101521894 B1 | 5/2015 |
| KR | 1020150062858 A | 6/2015 |

* cited by examiner (a) Control-Plane Protocol Stack (b) User-Plane Protocol Stack

METHOD FOR TERMINAL TO ESTABLISH MULTI-LINKS IN WIRELESS COMMUNICATION SYSTEM, AND APPARATUS THEREFOR

This application is a 35 USC § 371 National Stage entry of International Application No. PCT/KR2015/007797 filed on Jul. 27, 2015, which is hereby incorporated by reference in its entirety as if fully set forth herein.

TECHNICAL FIELD

The present invention relates to a wireless communication system, and more particularly, to a method performed by a user equipment for establishing multiple links through a relay user equipment and apparatus therefor.

BACKGROUND ART

Recently, in order to implement a next generation mobile communication, e.g., 5G mobile communication, discussion on highly reliable communication is in progress. An MCS (mission critical service) corresponding to an example of the highly reliable communication requires error free transmission. An M2M communication field also requires the necessity of the highly reliable communication as a method of satisfying real-time for traffic safety, traffic efficiency, efficient industrial communication, and the like. The highly reliable communication can be utilized in various fields such as an application, a medical/emergency response, remote controlling, sensing, and the like sensitive to delay.

According to the MCSs discussed in 3GPP standardization meeting, it is able to expect that there may exist more improvement in End-to-End Latency, Ubiquity, Security, Availability/Reliability compared to legacy UMTS/LTE, and LTE-A/Wi-Fi. The currently proposed commercial radio technologies (e.g., 3GPP LTE, LTE-A) are unable to satisfy the requirements of the MCS in terms of the real time and the reliability. Meanwhile, an evaluation criterion for communication reliability can be defined according to various schemes. For example, the evaluation criterion can be defined by quality of wireless connection that satisfies a level of a specific service, by which the present invention may be non-limited.

In order to implement highly reliable communication for MCSs, it is required to have improvement in a method of sensing and controlling a radio link, a method of controlling dualization of a radio link connection, a method of promptly recovering a radio link connection, a method of managing a security key for safe wireless transmission, authentication, a method of protecting a personal privacy, and the like. To this end, discussion on a method of quickly searching for an available alternative link near a user equipment and managing the link in consideration of power consumption, a method of improving reliability/availability in providing a service via an optimized radio link connection, a method of minimizing service interruption time for a user equipment via quick recovery when a radio link is disconnected, a method of implementing safe communication by preventing intentional radio link damage, and the like is in progress.

DISCLOSURE OF THE INVENTION

Technical Task

The technical task of the present invention is to provide a method performed by an out-out-coverage user equipment for establishing multiple links including a serving link and a replacement link through a relay user equipment rapidly and efficiently.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a method for establishing multiple links through relay user equipments (UEs) by an out-of-coverage UE in a wireless communication system, including: transmitting a radio resource control (RRC) connection request to a temporary relay UE having the highest device-to-device (D2D) signal quality among relay UEs located adjacent to the UE; receiving, from the temporary relay UE, an RRC connection setup indicating a first base station (BS) that will provide a serving link to the UE and a second BS that will provide a replacement link to the UE among BSs to which the relay UEs are connected; establishing the serving link through a first relay UE by transmitting an RRC connection complete message to the firs relay UE connected to the first BS among the relay UEs; and establishing the replacement link, where unicast data transmission and reception is inactivated, through a second relay UE connected to the second BS among the relay UEs.

Preferably, the method may further include: broadcasting an out-of-coverage indicator indicating that the UE is out of coverage; and receiving, from relay UEs that receive the out-of-coverage indicator, system information including at least one of link quality between the relay UEs and BSs to which the relay UEs are connected, a threshold for link quality degradation, and the number of maximum links that can be established by the UE. More preferably, the RRC connection request may include a list of relay UEs having link quality with BSs to which the relay UEs are connected equal to or higher than the threshold among the relay UEs.

Preferably, the first BS that will provide the serving link may be determined based on a load status of each of the BSs to which the relay UEs are connected.

Preferably, the method may include: receiving, from the relay UEs, side-link synchronization signals (SLSSs) allocated to the relay UEs by the BSs to which the relay UEs are connected; and synchronizing with the relay UEs based on the SLSSs, wherein the SLSSs may be allocated such that each of the SLSSs has a unique value per relay UE.

Preferably, the method may further include: when quality of the serving link established through the first relay UE becomes equal to or lower than a threshold, activating the unicast data transmission and reception of the replacement link established through the second relay UE; and releasing an RRC connection with the serving link established through the first relay UE.

Preferably, the method may further include: when quality of the replacement link established through the second relay UE becomes equal to or lower than a first threshold, discovering another replacement link through a third relay UE among the relay UEs; and when the quality of the replacement link established through the second relay UE becomes equal to or lower than a second threshold, releasing an RRC connection with the replacement link established through the second relay UE.

In another aspect of the present invention, provided herein is a method for supporting an out-of-coverage user equipment (UE) to establish multiple links by a base station (BSs) to which a temporary relay UE is connected in a wireless communication system, including: receiving a radio resource control (RRC) connection request from the out-of-coverage UE through the temporary relay UE; transmitting a load query request to BSs to which relay UEs are connected based on a list of the relay UEs included in the RRC connection request; determining a first BS that will provide a serving link to the out-of-coverage UE and a second BS that will provide a replacement link to the out-of-coverage UE based on responses transmitted from the BSs to which the relay UEs are connected in response to the load query request; and transmitting an RRC connection setup including information indicating the first and second BSs to the out-of-coverage UE through the temporary relay UE, wherein unicast data transmission and reception may be inactivated in the replacement link that will be provided by the second BS.

Preferably, the first BS may be a BS with the lowest load status among the BSs to which the relay UEs are connected, and the temporary relay UEs may be a UE with the highest device-to-device (D2D) signal quality with respect to the out-of-coverage UE among the relay UEs.

Preferably, an RRC connection setup complete message, which is transmitted by the out-of-coverage UE in response to the RRC connection setup transmitted by the BS, may be received by the first BS that will provide the serving link.

Preferably, the method may further include allocating a side-link synchronization signal, which will be transmitted from the temporary UE to the out-of-coverage UE, to the temporary UE, and wherein the SLSS allocated to the temporary UE may have a unique value different from those of the relay UEs.

Preferably, the method may further include: transmitting a multi-link connectivity request including an identifier (ID) of the out-of-coverage UE to each of the first and second BS; and receiving a multi-link connectivity response indicating whether the multi-link connectivity request is accepted from each of the first and second BS. More preferably, the multi-link connectivity request transmitted to the first BS may include an indicator indicating that the first BS will provide the serving link to the out-of-coverage UE, the multi-link connectivity request transmitted to the second BS may include an indicator indicating that the second BS will provide the replacement link to the out-of-coverage UE, and the multi-link connectivity response received from each of the first and second BSs may include an ID of the out-of-coverage UE and a dedicated preamble, which are allocated by each of the first and second BS.

In a further aspect of the present invention, provided herein is a out-of-coverage user equipment (UE) in a wireless communication system, including: a transmitter configured to transmit a radio resource control (RRC) connection request to a temporary relay UE with the highest device-to-device (D2D) signal quality among relay UEs located adjacent to the UE; a receiver configured to receive, from the temporary relay UE, an RRC connection setup indicating a first base station (BS) that will provide a serving link to the UE and a second BS that will provide a replacement link to the UE among BSs to which the relay UEs are connected; and a processor configured to establish the serving link through a first relay UE by transmitting an RRC connection complete message to the first relay UE connected to the first BS among the relay UEs and establish the replacement link, where unicast data transmission and reception is inactivated, through a second relay UE connected to the second BS among the relay UEs.

In a still further aspect of the present invention, provided herein is a base station (BS) for supporting an out-of-coverage user equipment (UE) to establish multiple links in a wireless communication system, including: a receiver configured to receive a radio resource control (RRC) connection request from the out-of-coverage UE through a temporary relay UE connected to the BS; a transmitter configured to transmit a load query request to BSs to which relay UEs are connected based on a list of the relay UEs included in the RRC connection request; and a processor configured to determine a first BS that will provide a serving link to the out-of-coverage UE and a second BS that will provide a replacement link to the out-of-coverage UE based on responses transmitted from the BSs to which the relay UEs are connected in response to the load query request, and wherein unicast data transmission and reception may be inactivated in the replacement link that will be provided by the second BS.

Advantageous Effects

According to an embodiment of the present invention, since a user equipment can determine a base station that will provide a serving link according to load statues of base stations connected to discovered relay user equipments rather than through temporary relay user equipments which are initially connected to the base stations. Therefore, multiple links including not only the serving link but also a replacement link can be established rapidly and efficiently.

It will be appreciated by persons skilled in the art that the effects that can be achieved through the present invention are not limited to what has been particularly described hereinabove and other advantages of the present invention will be more clearly understood from the following detailed description.

BEST MODE FOR INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
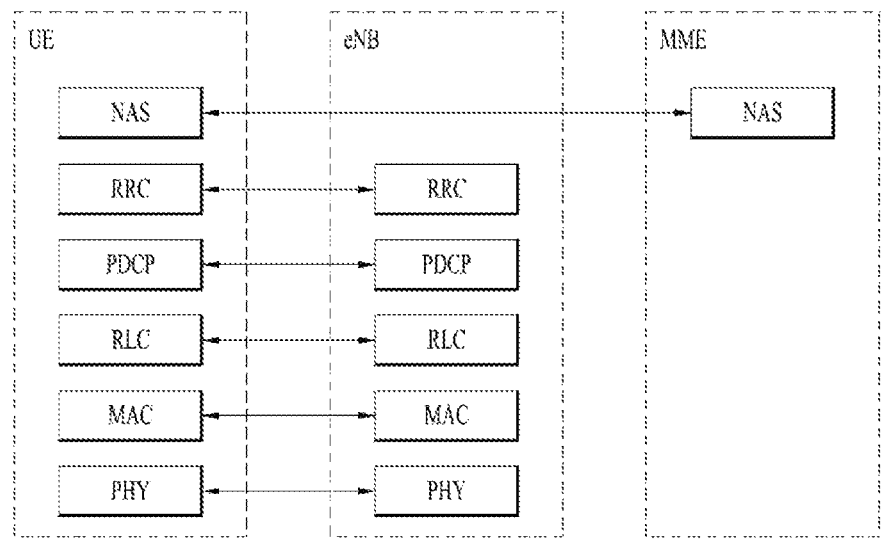
FIG. 1 is a diagram illustrating structures of a control plane and a user plane of a radio interface protocol between a user equipment and E-UTRAN based on the 3GPP radio access network standard.
Figure 1:
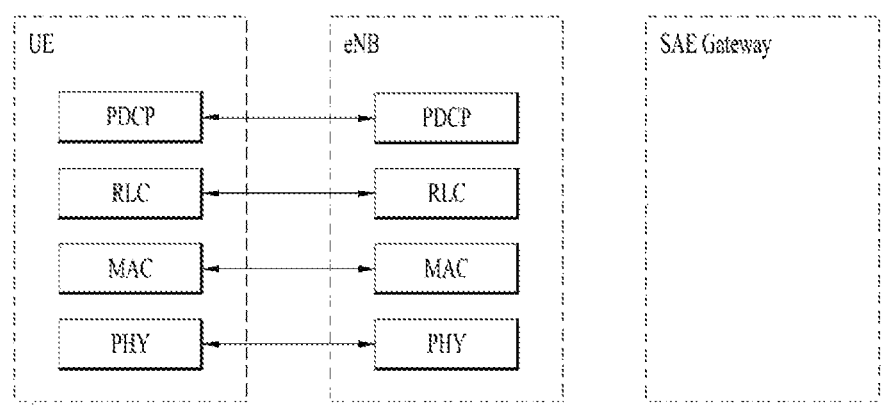

FIG. 1 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 2:
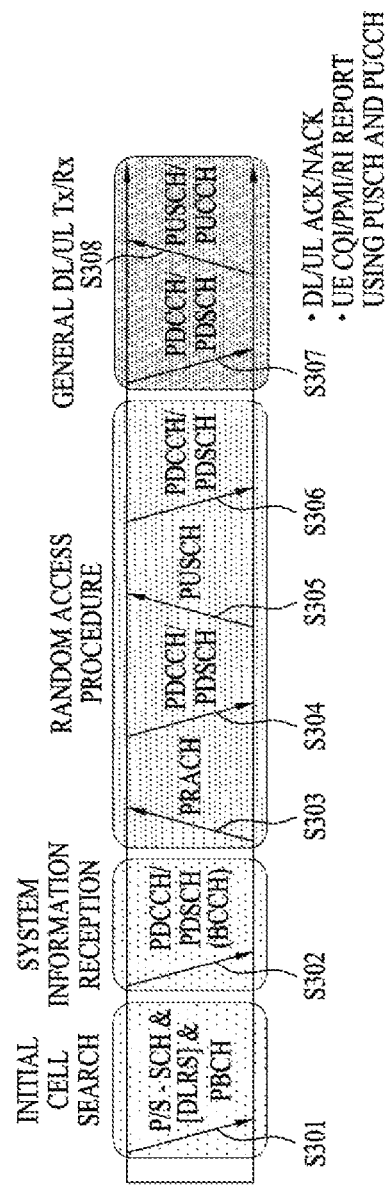
FIG. 2 is a diagram illustrating physical channels used in a 3GPP LTE system and a general method for transmitting a signal using the physical channels.

FIG. 2 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 3:
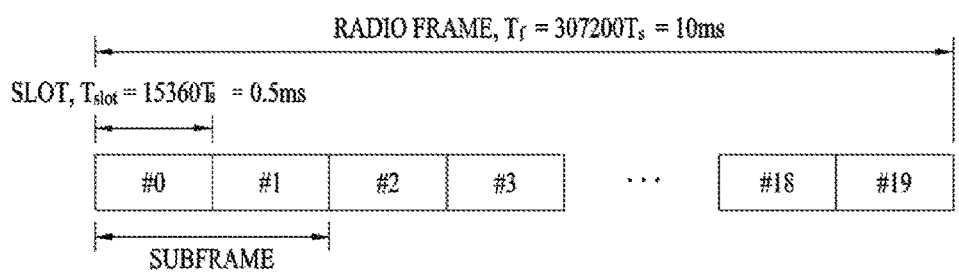
FIG. 3 is a diagram illustrating a structure of a radio frame used in an LTE system.

FIG. 3 is a diagram illustrating the structure of a radio frame used in an LTE system.

Referring to FIG. 3, the radio frame has a length of 10 ms (327200×$T_s$) and includes 10 equal-sized subframes. Each of the subframes has a length of 1 ms and includes two slots. Each slot has a length of 0.5 ms (15360 $T_s$). In this case, $T_s$ denotes a sampling time represented by $T_s$=1/(15 kHz× 2048)=3.2552×$10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 4:
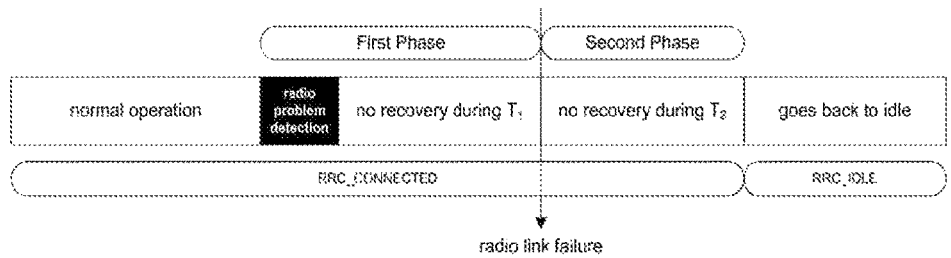
FIG. 4 is a diagram illustrating a radio link failure in LTE system.

FIG. 4 is a diagram illustrating a radio link failure in LTE system.

A radio link failure (RLF) may occur between a base station and a user equipment. The RLF corresponds to a state that it is difficult to transmit and receive a signal between a base station and a user equipment due to degradation of quality of a radio link between the base station and the user equipment. In the following, a procedure of detecting an RLF and a procedure of searching for a new radio link are explained.

In 3GPP LTE system, an RRC (radio resource control) state between a base station and a user equipment can be classified into RRC_CONNECTED state and RRC_IDLE state. The RRC_CONNECTED state corresponds to a state that an RRC connection is established between the base station and the user equipment. Hence, the user equipment can transceive data with the base station. The RRC_IDLE state corresponds to a state that an RRC connection is released between the base station and the user equipment.

An operation related to the RLF may include (1) detection of physical layer problems in the RRC_CONNECTED state, (2) recovery of physical layer problems, and (3) RLF detection.

(1) If a user equipment continuously receives "out-of-sync" indications from a lower layer as many as a predetermined value defined by N310, the user equipment drives a timer defined as T310. The "out-of-sync" indications can be provided to a higher layer when it is impossible to demodulate PDCCH received by a lower layer (physical layer) or when SINR (signal-to-interference plus noise ratio) is low. The N310 and the T310 correspond to higher layer parameters and can be given by a predefined value.

(2) If the user equipment receives continuous "in-sync" indications from the lower layer as many as a predetermined value defined by N311 while the T310 timer is driving, the user equipment stops the T310 timer. The N311 corresponds to a higher layer parameter and can be given by a predefined value. If the T310 timer is stopped, RRC connection is maintained without explicit signaling.

(3) On the contrary, if the T310 timer is expired, a random access problem indication is received from MAC layer, or an indication indicating the excess of the maximum retransmission number for an SRB (signaling radio bearer) or a DRB (data radio bearer) is received from RLC, the user equipment determines it as an RLF is detected. If the RLF is detected, the user equipment initiates a connection re-establishment procedure. If the T310 timer is expired, it indicates that the T310 timer arrives at determined time (T310) without stopping in the middle of driving the T310 timer. The connection re-establishment procedure corresponds to a procedure that the user equipment transmits an 'RRC connection re-establishment request' message to a base station, receives an 'RRC connection re-establishment' message from the base station, and transmits an 'RRC connection re-establishment completion' message to the base station. For details about the RLF-related operation, it may refer to the paragraph 5.3.11 of 3GPP standard document TS36.331.

As mentioned in the foregoing description, when a link status between a transmitter and a receiver is deteriorated, the RLF procedure may correspond to a procedure that a user equipment searches for a new link while operating an internal timer. In a system according to legacy 3GPP LTE standard, since it is difficult to anticipate a link (Uu link) between a base station and a user equipment, as mentioned in the foregoing description, it is able to determine whether or not an RLF is detected based on such a parameter as N310, N311, T310, or the like.

In particular, when an RLF is controlled based on a plurality of timers, although a user equipment recognizes a physical layer problem, the user equipment is able to determine an RLF only when a set timer (e.g., T310, T312) is expired. Subsequently, the user equipment performs an RRC connection re-establishment procedure. The user equipment starts a T311 timer while performing the RRC connection re-establishment procedure. If the user equipment fails to reestablish an RRC connection before the T311 timer is expired, the user equipment is switched to an RRC idle state.

Since the current LTE/LTE-A system is designed to conservatively process recovery from an RLF, it is difficult to search for an available link capable of being promptly replaced according to a channel state of a user equipment and it is difficult to secure an available alternative link for switching a connection to an alternative link. Hence, it is difficult for LTE system to satisfy reliability for MCSs. Since LTE/LTE-A system assumes a relatively good connectivity, if the LTE/LTE-A system experiences severe interference or a network resource is in an overload state, a considerably low transfer rate is provided.

However, as mentioned in the foregoing description, the next generation mobile communication should satisfy a rate of error occurrence equal to or less than $10^{-6}$ and reliability requirement equal to or less than $10^{-6}$. Hence, it is necessary to construct a highly reliable system capable of providing MCSs to a user equipment at all times while the user equipment does not recognize a disconnection of a radio link.

For example, exemplary services applicable to a 5G mobile communication environment for MCSs may include remote control of robot arms for industrial automation, physical distribution delivery through remote control of automated guided vehicles (AGVs), remote medical services, remote control of drones, information exchange between vehicles for providing autonomous driving services, transmission of signals for indicating a hidden vehicle, which is not detected by vehicle's sensors (e.g., camera, radar, etc.) or a forward collision, and the like, but the present invention is not limited thereto.

To provide a seamless service, when the quality of a serving link is degraded, a user equipment (UE) needs to discover and secure a replacement link before the degradation. Specifically, if the serving link quality is degraded so that it is not suitable for MCSs, the UE should switch to the replacement link rapidly. That is, by rapidly detecting the degradation of the serving link quality, the UE can secure the replacement link and then switch to the secured replacement link before an RLF occurs.

In this specification, discovering and maintaining of replacement links except the currently used link could be interpreted to mean that a UE has radio links capable of satisfying the minimum QoE for MCSs in a specific geographical area.

The radio link capability of the LTE/LTE-A system entirely depends on the probability of providing network coverage. In the LTE/LTE-A system, it is assumed that in the case of unicast transmission, a block error rate (BER) of $10^{-1}$ is applied without distinction between C-Plane and U-Plane, and sufficiently high reliability is provided through HARQ retransmission. However, to provide MCSs in the 5G mobile communication environment, a UE should always maintain and secure replacement links such that the target reliability of the MCSs is satisfied.

Meanwhile, since it is difficult for the network to inform a UE of an available replacement link every time according to UE's surrounding environments, the network can instruct the UE to use nearby radio links itself. For example, it is possible to consider a method for enabling a UE to discover and secure nearby available replacement links to prevent a radio link for MCS provision from being disconnected.

However, since the environment for providing the MCSs varies, there may be no serving link base station (BS) adjacent to the UE (i.e., out of coverage) or the radio link quality with a serving link BS may be low. In this case, the UE may use a nearby UE capable of providing a relay function (e.g., ProSe supporting UE defined in 3GPP LTE/LTE-A Rel-12). If the radio link quality with the relay UE is greater than that with the serving link BS, the UE can be continuously provided with the MCSs through a direct link with the relay UE.

Hereinafter, methods performed by a UE provided with MCSs for establishing multiple links and discovering and maintaining a replacement link are described. For example, a method performed by a UE out of coverage of a BS for establishing multiple links with the BS through relay UEs in the coverage is described. In addition, a method performed by a UE for switching a connection with a serving BS of a relay UE, which is temporarily connected, to a serving BS of another relay UE is described. In this case, it is assumed that the relay UEs are connected to different BSs. In the present invention, a relay UE may be a ProSe supporting UE capable of discovering a neighboring UE and performing direct communication with another UE.

In this specification, a reliability index for MCSs is named radio link availability (RLA). In addition, when the quality of experience (QoE) of a UE is expressed in terms of link quality, RLA can be defined as shown in Equation 1.

$$RLA = Pr(RLQ \geq QoE) \quad \text{[Equation 1]}$$

In Equation 1, the RLA indicates measured radio link quality, and the QoE indicates QoE requirements in terms of link quality.

The embodiments of the present invention can be classified as follows, and UE's operation for each configuration will be described later.

- A process for discovering a replacement link based on a threshold value when the quality of a serving link BS is degraded
- A process in which a UE informs a serving link BS of a replacement link and establishes an RRC connection, where unicast data transmission and reception is inactivated, via the replacement link
- A process for discovering and securing another replacement link according to changes in the quality of a discovered replacement link BS FIGS. 5 to 8 illustrate embodiments in which a UE establishes a connection with a BS through a plurality of relay UEs while performing an initial access procedure. In the embodiments of FIGS. 5 to 8, it is assumed that relay UEs are synchronized with each other. For example, the present embodiments can be applied to a case where relay UEs are connected to a small cell and a TA between small cells, which are connected to an MCS UE and the relay UEs respectively, is approximated to zero, or an environment where an asynchronized system with a new waveform is established.

Detection of an MCS UE by a relay UE and detection of a relay UE by an MCS UE may be performed based on Prose Direct Discovery defined in the 3GPP LTE/LTE-A system. The relay UE (or MCS UE) receives an E-UTRAN direct radio signal (e.g., discovery message) transmitted from the MCS UE (or relay UE) through a PC5 interface. By doing so, the relay UE (or MCS UE) may recognize that the MCS UE (or relay UE) is located nearby.

A UE obtains resource information for synchronization signals and system information on individual channels through a system information block (SIB), for example, SIB18, which is transmitted from a relay UE. The SIB transmitted from the relay UE may be a newly defined SIB or SIB18 to which additional information is added.

Figure 5:
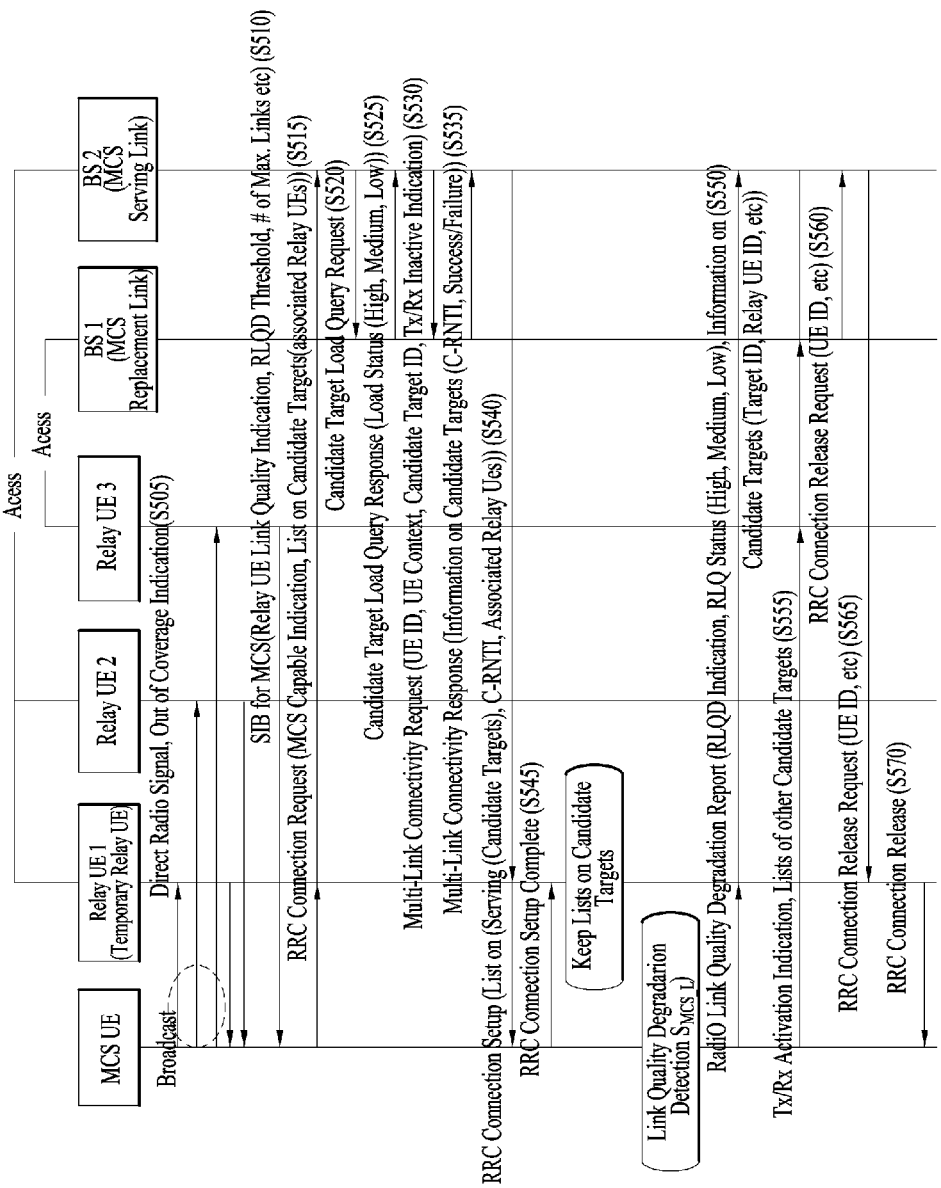
FIG. 5 is a flowchart illustrating a method for establishing multiple links through a temporary relay user equipment according to an embodiment of the present invention.
Figure 6:
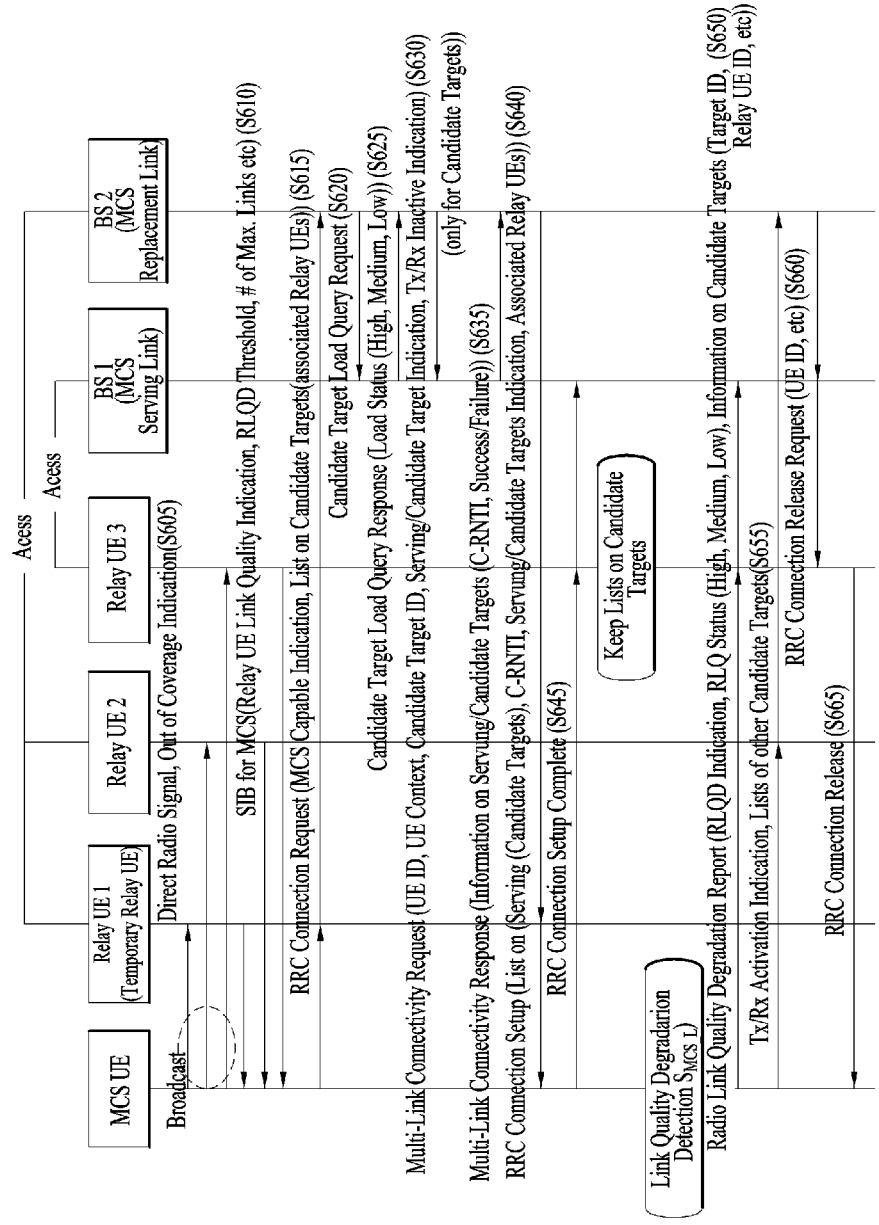
FIG. 6 is a flowchart illustrating a method for establishing multiple links through a temporary relay user equipment according to another embodiment of the present invention.
Figure 7:
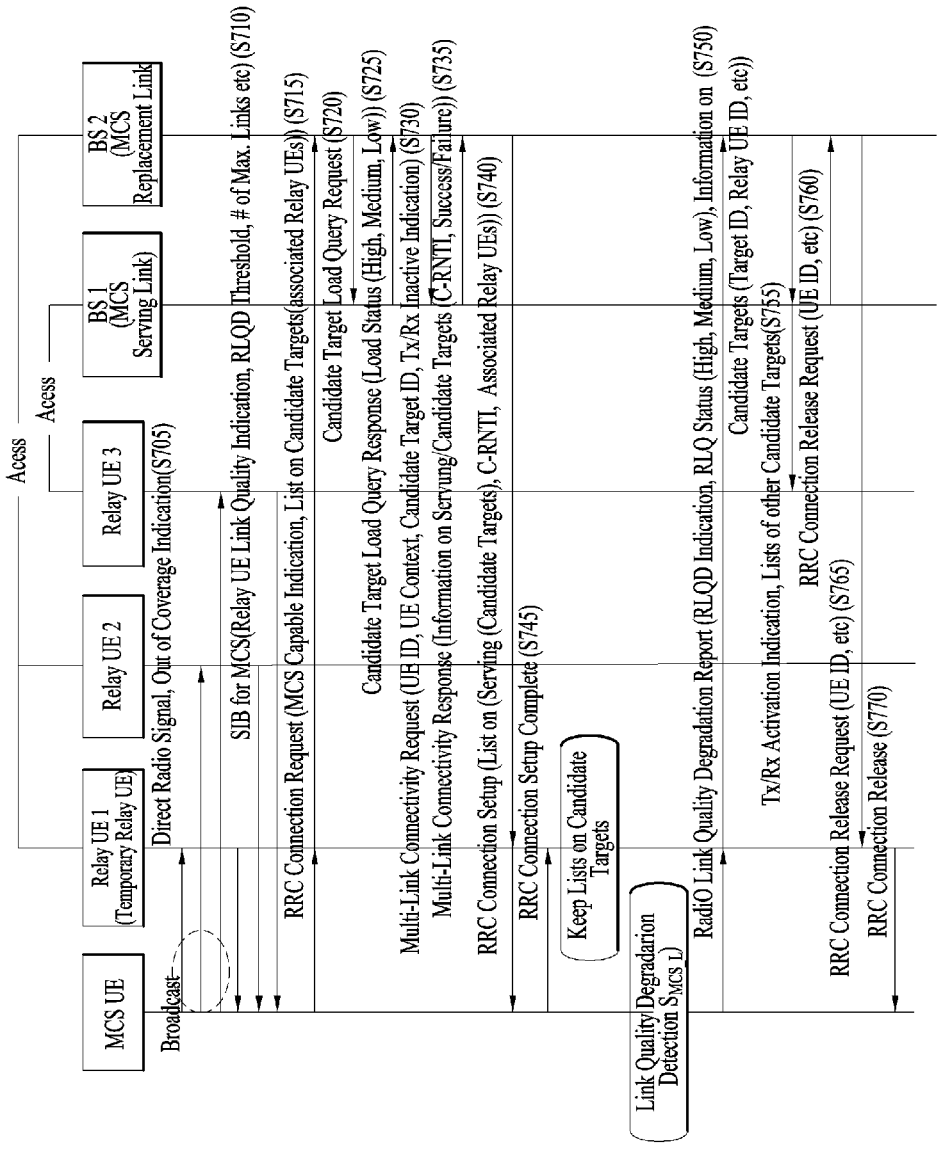
FIG. 7 is a flowchart illustrating a method for establishing multiple links through a temporary relay user equipment according to a further embodiment of the present invention.
Figure 8:
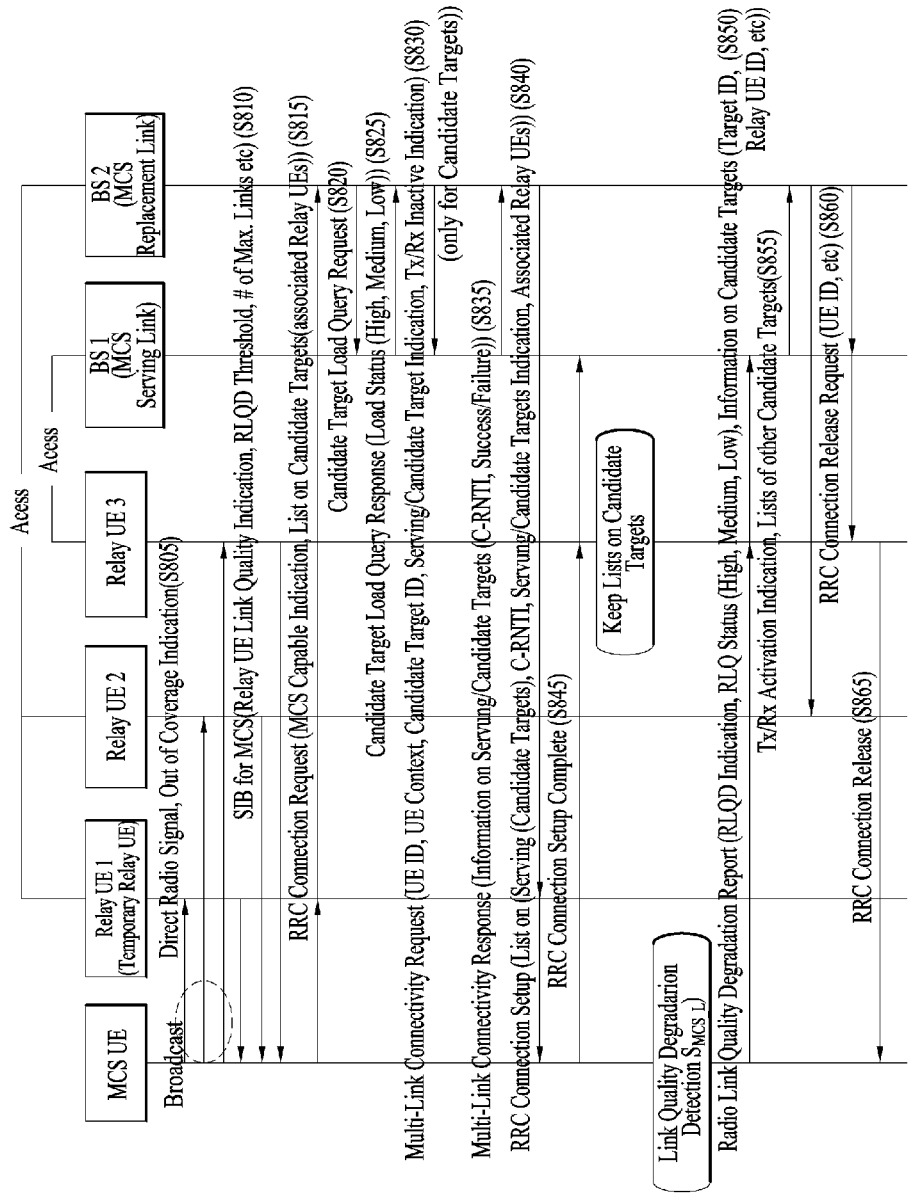
FIG. 8 is a flowchart illustrating a method for establishing multiple links through a temporary relay user equipment according to a still further embodiment of the present invention.

The embodiments of FIGS. 5 and 7 show a case in which a BS (BS 2) connected to a temporary relay UE (relay UE 1), to which an MCS UE initially attempts to connect, becomes a serving BS of the MCS UE. On the other hand, the embodiments of FIGS. 6 and 8 show a case in which a BS (BS 1) connected to a different relay UE (relay UE 3) becomes a serving link BS of an MCS UE instead of a BS of a temporary relay UE which the MCS UE initially attempts to connect to.

In the following embodiments, it is assumed that the relay UE 1 and relay UE 2 are connected to the BS 2 and the relay UE 3 is connected to the BS 1. In addition, it is assumed that an MCS UE is out of not only coverage of the BS 1 but also coverage of the BS 2. In this case, the temporary relay UE, which is initially connected to the MCS UE, may be determined as a UE with the highest D2D signal quality with respect to the MCS UE among relay UEs. In the present embodiments, the relay UE 1 plays a role of the temporary relay UE initially connected to the MCS UE.

First, referring to the embodiment of FIG. 5, the MCS UE broadcasts a direct radio signal and an out-of-coverage indication [S505]. Here, the out-of-coverage indication is a signal transmitted by the MCS UE, which is out of the coverage, to inform neighboring device-to-device (D2D) supporting relay UEs of its existence, and the direct radio signal is a signal for indicating that the MCS UE requires relay UEs. The out-of-coverage indication triggers transmission of an SIB (e.g., SIB for an MCS) from the relay UE.

After receiving the out-of-coverage indication, the relay UEs that determine to perform relaying for the MCS UE broadcast the SIB for the MCS [S510]. The SIB for the MCS includes a relay UE link quality indication, a radio link quality degradation (RLQD) threshold, and information on the number of maximum links. The relay UE link quality indication informs whether the signal quality between a relay UE and BS is higher than a predetermined threshold ($R_{MCS\_L}$). If the link quality between the relay UE and BS is lower than the threshold ($R_{MCS\_L}$) even though the link quality between the MCS UE and relay UE is excellent, the MCS UE may not include a link to the corresponding relay UE in a replacement link candidate list. In addition, in the case of a relay UE which has set as a replacement link candidate because its link quality was higher than the threshold, if the relay UE fails to satisfy the threshold, the MCS UE may discover another relay UE for the replacement link by receiving the relay UE link quality indication again.

The RLQD threshold may include information on thresholds for multi-link connections. For example, the RLQD threshold may include a threshold of the minimum signal quality for selecting a serving BS in the initial connection, a signal quality threshold for discovering a replacement link, a signal quality threshold for releasing a serving link (or replacement link), etc.

The information on the number of maximum links means the maximum number of replacement links that the MCS UE can simultaneously connect to for the serving link.

The MCS UE transmits an RRC connection request to the temporary relay UE [S515]. The temporary relay UE is the UE with the highest D2D signal quality with respect to the MCS UE among the relay UEs transmitting the SIB. The RRC connection request may include a list of BSs of the relay UEs, which is obtained from the SIB. The temporary relay UE forwards the BS list received from the MCS UE to the connected BS.

Based on the BS list included in the RRC connection request, the BS connected to the temporary relay UE, BS 2 transmits a load query request to ask a load status of the BS connected to the relay UE 3, BS 1 [S520].

Thereafter, the BS 2 receives a response to the load query request from the BS 1 [S525]. The response to the load query request may indicate a high, medium or low load status. If a BS connected to a specific relay UE is in the high load status even though the D2D signal quality between the MCS UE and specific relay UE is excellent, the BS is considered to be not suitable for providing MCSs. Thus, to select a BS capable of allocating resources for the MCSs as many as possible in spite of not having the highest D2D signal quality, the BSs exchange information on their load statuses. That is, the BS most suitable for resource allocation for the MCSs can be selected as a BS that will provide the MCSs to the MCS UE.

Based on the response to the load query request, the BS 2 determines a BS that will operate as the serving link BS for the MCS UE. Among the BSs, a BS with the lowest load status may be determined as the serving link BS. In this embodiment, the BS 2 is assumed to be the serving link BS of the MCS UE. Except the BS 2 determined as the serving link BS, the remaining BS becomes a candidate replacement link BS for the MCS UE.

The BS 2 transmits, to the BS 1 corresponding to the candidate replacement link BS, a multi-link connectivity request including an MCS UE context, an ID of the relay UE that will perform relaying for the MCS UE, and an indicator indicating that transmission and reception is inactivated (i.e., transmission/reception (Tx/Rx) inactive indication) [S530]. The Tx/Rx inactive indication indicates that Tx/Rx is inactivated. If a different BS except the BS connected to the temporary relay UE is determined as the serving BS, the multi-link connectivity request may further include an indicator indicating the serving BS and candidate BSs.

The BS 2 receives, from the BS 1, a multi-link connectivity response including information on a C-RNTI for the MCS UE and information indicating success/failure of the multi-link connectivity request (i.e., information on whether the BS 1 accepts the multi-link connectivity request) [S535].

The BS 2 transmits an RRC connection setup to the MCS UE through the temporary relay UE [S540]. The RRC connection setup includes information on an ID of the serving link BS, an ID of the replacement link BS, IDs of relay UEs connected to each BS, and C-RNTIs allocated by the serving link BS and replacement link BS.

The MCS UE transmits an RRC connection setup complete message to the BS 2 connected to the temporary relay UE through the temporary relay UE [S545]. The serving link is established between the MCS UE and BS 2 through the temporary relay UE, and the replacement link is established between the MCS UE and BS 1 through the relay UE 3.

When serving link quality is degraded so that it is lower than the threshold, the MCS UE transmits an RLQD report to the BS 2 through the temporary relay UE [S550]. The RLQD report may include an indicator indicating the quality degradation, an RLQ state of the serving link (e.g., high, medium, or low) and information on replacement link BSs.

The MCS UE transmits an indicator indicating that the replacement link is activated (i.e., Tx/Rx activation indication) and a list of the replacement link BSs [S555]. The BS 1 transmits an RRC connection release request to the BS 2 [S560]. The BS 2 forwards the RRC connection release request to the temporary relay UE [S565], and the temporary relay UE releases the RRC connection with the MCS UE [S570].

FIG. 6 illustrates an initial access procedure performed by an MCS UE according to another embodiment of the present invention. Overlapping description will be omitted. Specifically, FIG. 6 shows a case in which BS 1 becomes a serving link BS for the MCS UE rather than BS 2 connected to a temporary relay UE. A multi-link connectivity request transmitted from the BS 2 includes an indicator indicating which BS is determined as a serving link BS for the MCS UE. In addition, an RRC connection setup transmitted to the MCS UE includes an indicator indicating the serving link BS. The MCS UE transmits an RRC connection setup complete message to a relay UE connected to the serving link BS. The BS 2 becomes a replacement link BS for the MCS UE, and the replacement link where data transmission and reception is inactivated is established between the BS 2 and MCS UE through the temporary relay UE.

In the embodiments of FIGS. 5 and 6, the MCS UE requests the replacement link BS to activate the replacement link through the relay UE. On the contrary, in the embodiment of FIGS. 7 and 8, a serving link BS instructs a replacement link BS to activate a replacement link. Specifically, after receiving an RLQD report from an MCS UE through a temporary relay UE, BS 2 transmits a Tx/Rx activation indication and a replacement link BS list [S755 and S855]. BS 1 instructs relay UE 3 to activate transmission and reception through the replacement link. Thereafter, the BS 1 transmits an RRC connection release request to the BS 2 [S760 and S860]. The BS 2 instructs the temporary relay UE to release an RRC connection, and then the temporary relay UE releases the RRC connection with the MCS UE [S770 and S865].

Figure 9:
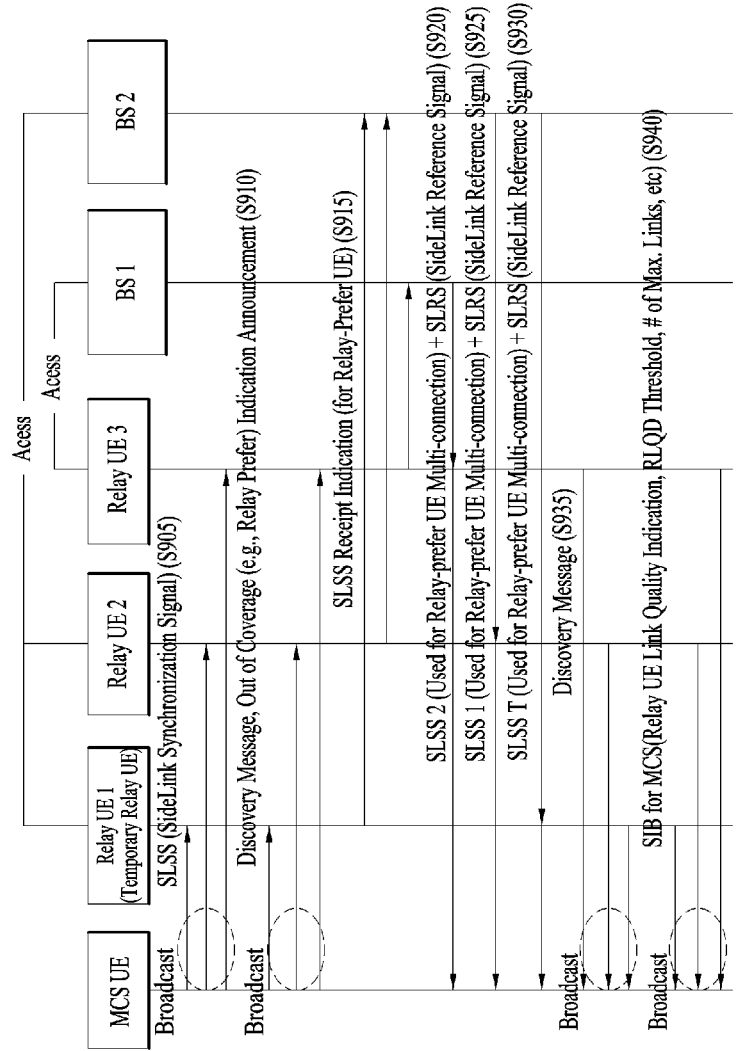
FIG. 9 is a flowchart illustrating a synchronization process between a user equipment and relay user equipments according to an embodiment of the present invention.

FIG. 9 illustrates a synchronization process between UEs according to an embodiment of the present invention. In this embodiment, it is assumed that an MCS UE is out of BSs' coverage and is not synchronized with any BS.

Referring to FIG. 9, the MCS UE broadcasts a side-link synchronization signal (SLSS) for enabling neighboring D2D relay UEs to synchronize with the MCS UE [S905].

The MCS UE broadcasts a discovery message [S910]. Specifically, the MCS UE informs relay UEs of its existence (e.g., L2 Address, ProSe UE ID, etc.) by broadcasting the discovery message. The discovery message may include a relay preference indicator for indicating that the MCS UE is out of the coverage and prefers relaying. In addition, the discovery message may include an MCS UE ID (e.g., GUTI). Meanwhile, according to another embodiment of the present invention, the MCS UE may broadcast the SLSS and discovery message at the same time.

Among relay UEs that receive the relay preference indicator, a relay UE that intends to perform relaying transmits, to a BS connected to the relay UE, an indicator indicating that the relay preference indicator has been received [S915]. In this case, an ID of the MCS UE may be transmitted to the BS together.

BSs allocate SLSSs, which are required for the MCS UE to synchronize with the relay UEs, to the relay UEs [S920]. In this case, each relay UE may be allocated a unique SLSS. For example, a first SLSS may be allocated to relay UE 1, and a second SLSS may be allocated to relay UE 2. The MCS UE may identify the relay UE 1 and relay UE 2 using the first SLSS and second SLSS, respectively.

However, if the SLSSs are set to be equal to each other, the MCS UE cannot identify the relay UEs. In this case, the BSs may allocate relay UE specific side-link reference signals (SLRSs) to the relay UEs. Using the SLRSs, the MCS UE may measure which relay UE has the highest D2D link quality. That is, using the SLSSs and SRSSs, the MCS UE may determine which relay UE becomes a temporary relay UE.

Thereafter, the relay UE broadcasts a discovery message [S935] and then broadcasts an SIB [S940]. The embodiment of FIG. 9 can be applied to not only the d embodiments described above with reference to FIGS. 5 to 8 but also the embodiments which will be described with reference to FIGS. 10 to 13.

FIGS. 10 to 13 illustrate the embodiments in which the MCS UE establishes connections with a plurality of relay UEs in performing the initial access procedure. Overlapping description will be omitted.

In the embodiments of FIGS. 10 to 13, it is assumed that an MCS UE needs to synchronize with relay UEs. The MCS UE transmits a E-UTRAN direct radio signal through a PC5 interface according to Prose Direct Discovery defined in the 3GPP LTE/LTE-A system. By receiving the direct radio signal, relay UEs can know that the MCS UE is located nearby. The MCS UE obtains resource information for synchronization signals and system information on individual channels through SIBs transmitted from the relay UEs.

Figure 10:
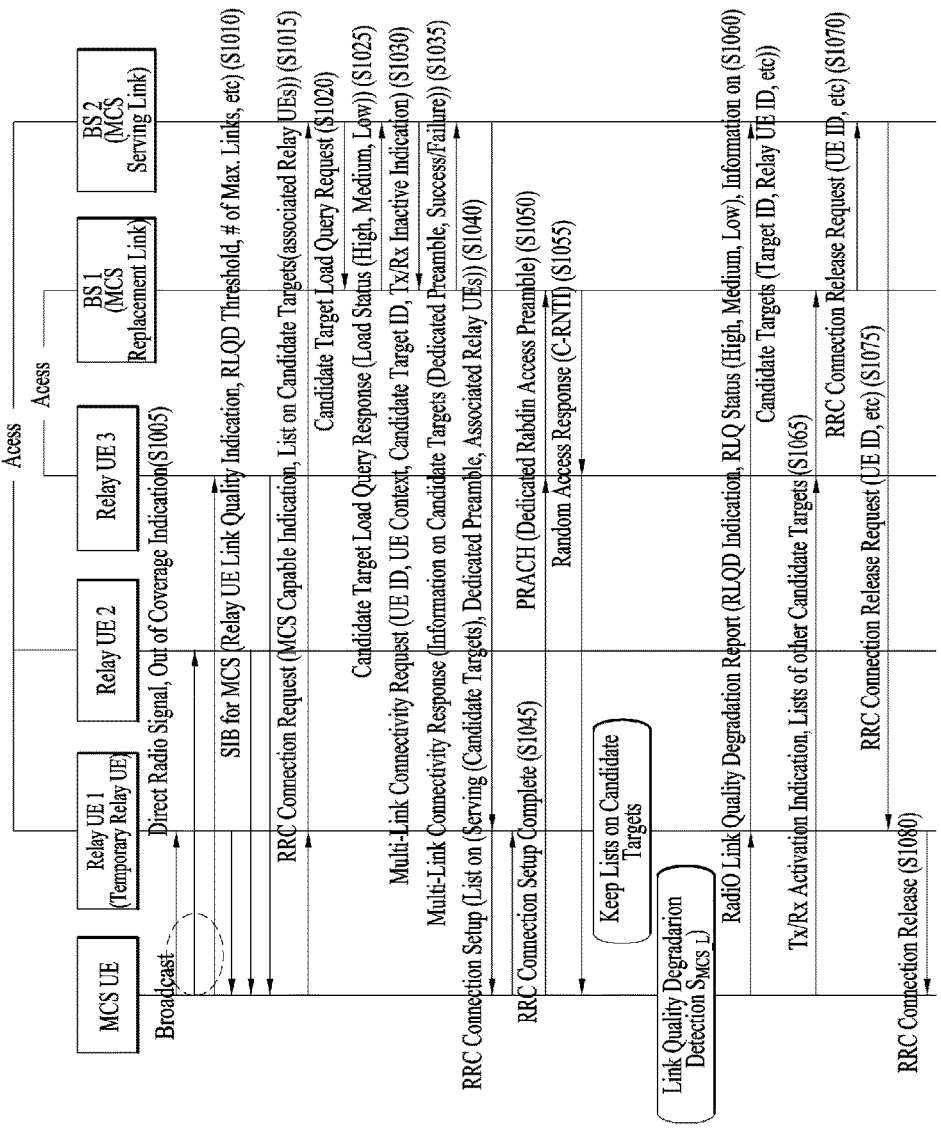
FIG. 10 is a flowchart illustrating a method for establishing multiple links through a temporary relay user equipment according to a still another embodiment of the present invention.
Figure 11:
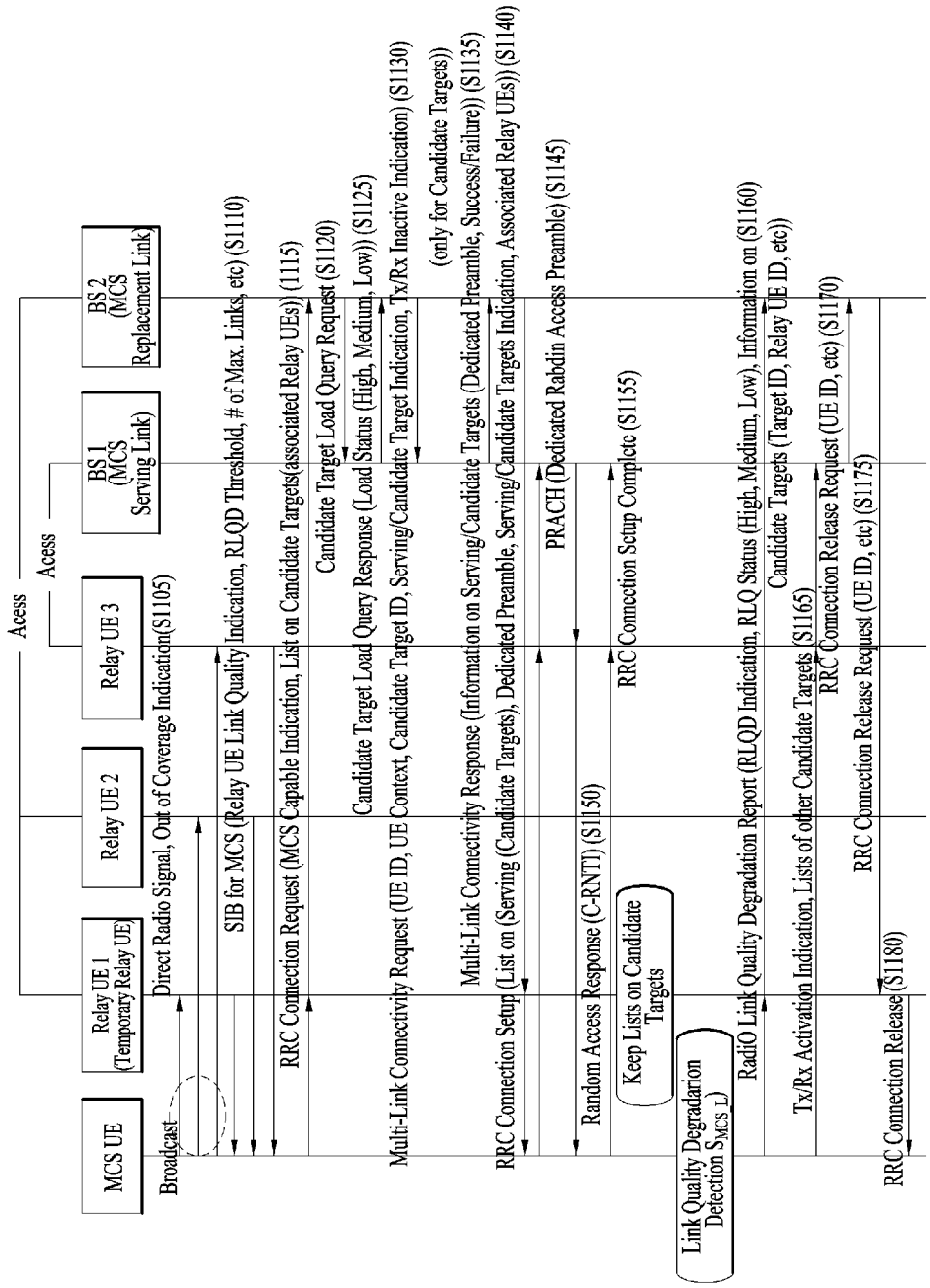
FIG. 11 is a flowchart illustrating a method for establishing multiple links through a temporary relay user equipment according to yet another embodiment of the present invention.
Figure 12:
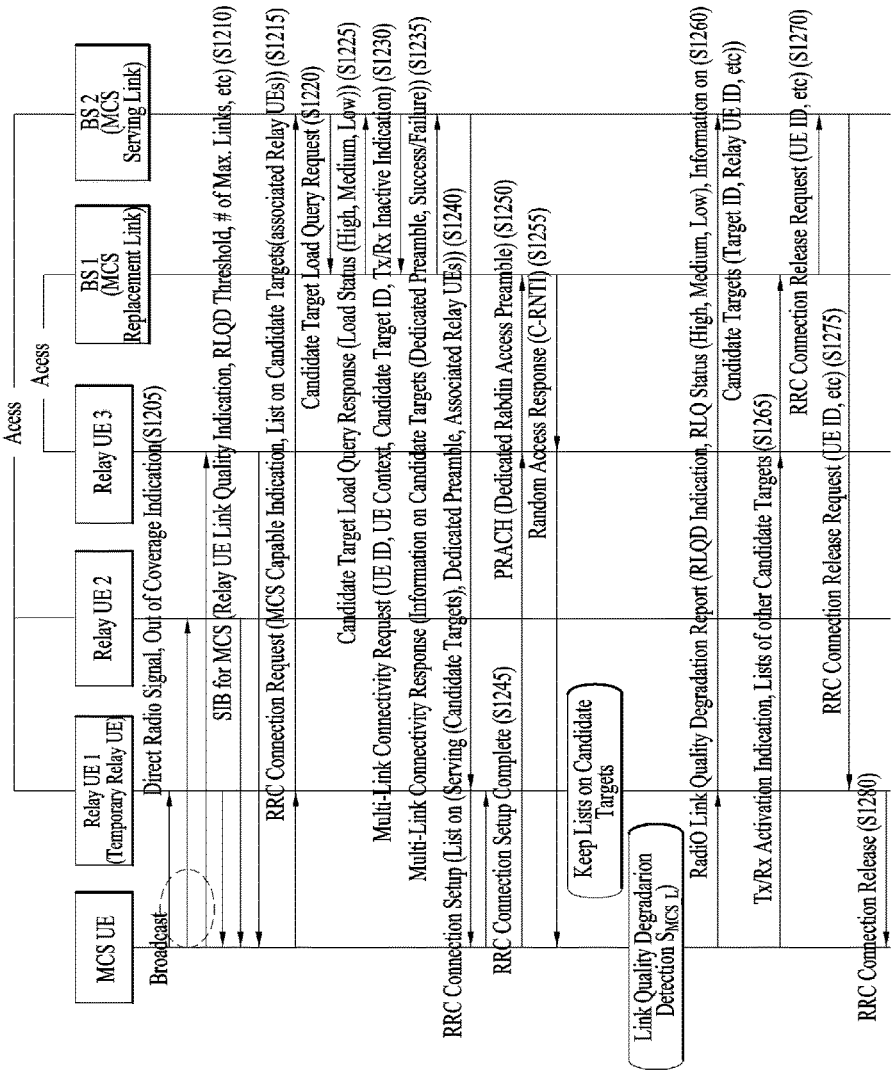
FIG. 12 is a flowchart illustrating a method for establishing multiple links through a temporary relay user equipment according to yet still another embodiment of the present invention.
Figure 13:
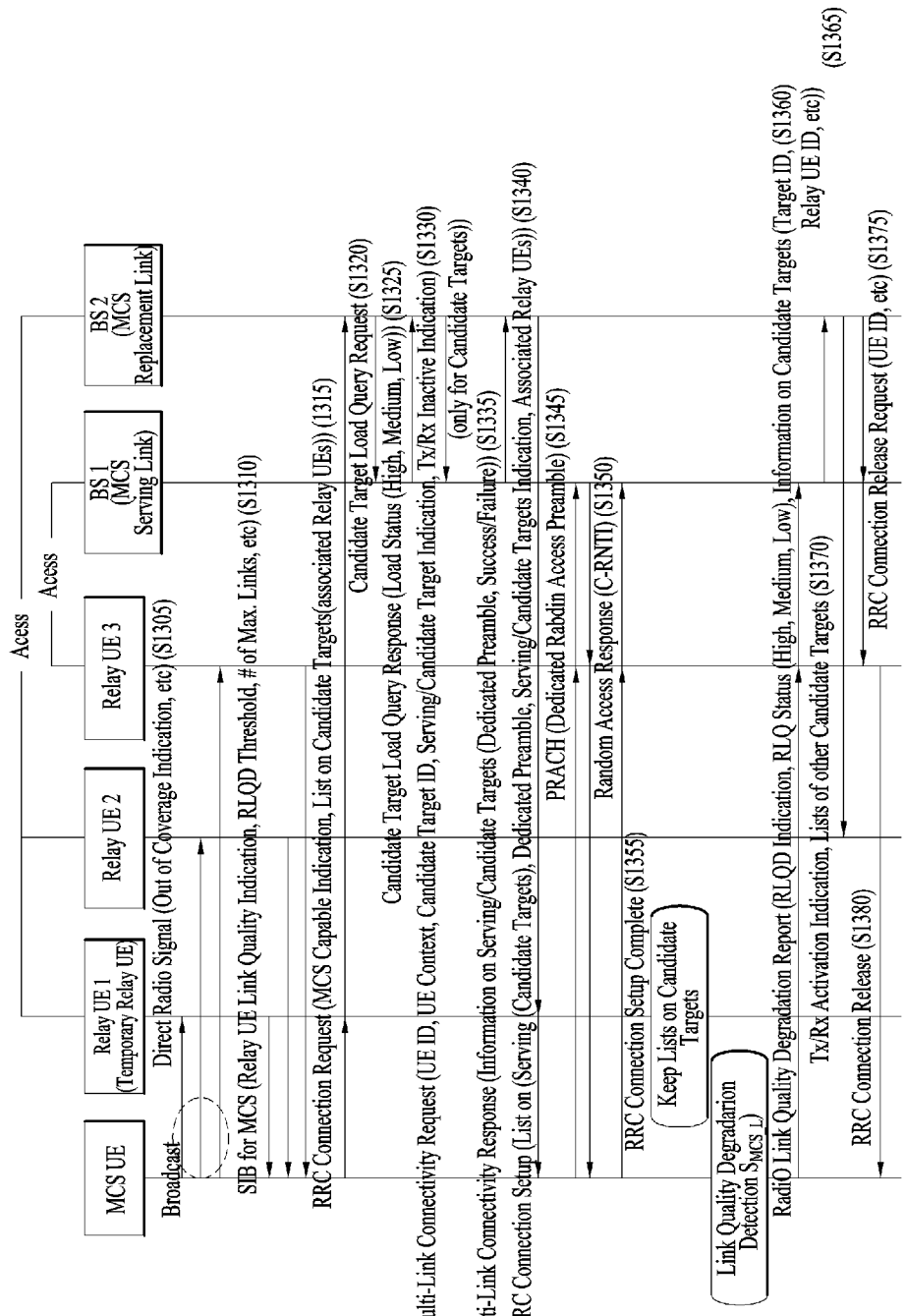
FIG. 13 is a flowchart illustrating a method for establishing multiple links through a temporary relay user equipment according to a yet further embodiment of the present invention.

FIGS. 10 and 12 illustrate a case in which BS 2 connected to a temporary relay UE becomes a serving link BS for the MCS UE. FIGS. 11 and 13 illustrate a case in which BS 1 connected to relay UE 3 rather than the temporary relay UE becomes the serving link BS for the MCS UE. In FIGS. 10 and 11, if the quality of a serving link is lower than the predetermined threshold, the MCS UE transmits an RLQD report to the serving link BS through the relay UE, which is connected through the serving link. In addition, the MCS UE requests the replacement link BS to activate an RRC connection through the relay UE connected through the replacement link and also transmits information on other replacement link BSs.

Referring to FIG. 10, the MCS UE broadcasts a direct radio signal and an out-of-coverage indication [S1005].

Among relay UEs that receive the direct radio signal and out-of-coverage indication, a relay UE, which determines to perform relaying, broadcasts an SIB including information on the link quality between the relay UE and a BS connected to itself [S1010].

The MCS UE transmits, to the temporary relay UE, an RRC connection request including a list of candidate BSs and a list of relay UEs connected to the candidate BSs [S1015]. The temporary relay UE forwards the RRC connection request from the MCS UE to the BS 2.

Based on the lists included in the RRC connection request, The BS 2 connected to the temporary relay UE transmits a load query request to ask a load status of the BS 1, which corresponds to a replacement link BS candidate [S1020].

The BS 2 receive a response to the load query request from the BS 1 [S1025]. The BS 2 determines the serving link BS for the MCS UE. In the present embodiment, it is assumed that the BS 2 is determined as the serving link BS.

The BS 2 transmits, to the BS 1, a multi-link connectivity request including an MCS UE ID, an MCS UE context, candidate relay UEs, and Tx/Rx inactivation indication [S1030].

The BS 2 receives, from the BS 1, a multi-link connectivity response including a dedicated preamble for the MCS UE and information on whether the multi-link connectivity request is accepted.

The BS 2 transmits an RRC connection setup to the MCS UE through the temporary relay UE [S1040]. The RRC connection setup includes IDs of the serving/candidate BSs, IDs of relay UEs connected to the serving/candidate BSs, and a dedicated preamble allocated by each of the candidate BSs.

The MCS UE transmits an RRC connection setup complete message to the BS 2 through the relay UE 1 in response to the RRC connection setup [S1045].

Using the dedicated preamble, the MCS UE synchronizes with the BS 1 [S1050]. That is, the MCS UE transmit the dedicated preamble, which is received by itself, to the BS 1 through the relay UE 3 and then receives a random access response including a C-RNTI for the MCS UE from the BS 1. Thereafter, the replacement link is established between the MCS UE and BS 1 through the relay UE 3.

Referring to FIG. 11, instead of the BS 2 connected to the temporary relay UE, the BS 1 connected to the relay UE 3 becomes the serving link BS for the MCS UE. The BS 2 determines the BS 1 as the serving link BS for the MCS UE, and then transmits a multi-link connectivity request to the BS 1 [S1130]. The multi-link connectivity request includes an indicator indicating that the BS 1 serves as the serving link BS for the MCS UE. The BS 2 transmits an indicator indicating the determined serving link BS to the MCS UE through an RRC connection setup message [S1140]. The MCS UE transmits an RRC connection complete message to the BS 1 corresponding to the serving link BS.

Unlike the embodiment of FIGS. 10 and 11, in the embodiments of FIGS. 12 and 13, the serving link BS transmits an activation indication to the replacement link BS. If the quality of the serving link is degraded so that it is lower than the predetermined threshold, the MCS UE transmits the RLQD report to the serving link BS through a serving link relay UE. The serving link BS instructs a replacement link BS with the highest signal quality to activate the RRC connection with the MCS UE and then transmits information on other replacement link BSs.

Replacement Link Discovery and Connection Setup Due to Degraded Quality of Serving Link BS Hereinafter, a method performed by an MCS UE directly connected to a serving link BS for discovering a replacement link through a relay UE when the MCS UE recognizes that serving link quality is degraded will be described. To determine whether the link signal quality is degraded, thresholds are defined as follows.

First threshold ($S_{MCS\_U}$): An upper threshold defined with respect to the serving link quality Second threshold ($S_{MCS\_L}$): A lower threshold defined with respect to the serving link quality Third threshold ($A_{MCS\_U}$): An upper threshold defined with respect to the replacement link quality Fourth threshold ($A_{MCS\_L}$): A lower threshold defined with respect to the replacement link quality These thresholds can be shared between a BS and a UE through an SIB or UE-dedicated RRC signaling. The SIB or UE-dedicated RRC signaling may further include dedicate carrier information for MCSs.

It is preferable that the thresholds are set such that a target BER at a physical layer for the MCSs is satisfied. For example, if the target BER for the MCSs is in the range of $10^{-9}$ to $10^{-6}$, an MCS threshold corresponding to a BER of $10^{-9}$ may be set to the first threshold, and an MCS threshold corresponding to a BER of $10^{-6}$ may be set to the second threshold.

Next, a relationship among the thresholds and RSRP/RSRQ thresholds will be described. The second threshold ($S_{MCS\_L}$) for the serving link release should be set to be relatively higher than an RSRP/RSRQ threshold for handover. The first threshold ($S_{MCS\_U}$) for the replacement link discovery, which is required when the serving link quality is degraded, should be set to be higher than the second threshold ($S_{MCS\_L}$) for the serving link release. In addition, the fourth threshold ($A_{MCS\_L}$) for the replacement link release may be set to be higher than the third threshold ($A_{MCS\_U}$) for the replacement link discovery. The third threshold ($A_{MCS\_U}$) for discovering a different replacement link, which is required when the quality of a secured replacement link is degraded, may be set to be higher than the fourth threshold ($A_{MCS\_L}$) for the replacement link release. It can be summarized as shown in Equation 2.

RSRP/RSRQ
$$\text{Threshold} \ll S_{MCS\_L} < S_{MCS\_U} \leq A_{MCS\_L} \leq A_{MCS\_U} \quad \text{[Equation 2]}$$

In addition, a fifth threshold with respect to the link quality between a relay UE and a BS connected to the relay UE is defined as follows.

Fifth threshold ($R_{MCS\_L}$): A lower threshold defined with respect to the link between the relay UE and the BS connected to the relay UE Using the fifth threshold, the MCS UE may determine whether to select the relay UE and BS connected to the relay UE as the replacement link.

A relationship between the fifth threshold and an RSRP threshold in the LTE/LTE-A system can be defined as shown in Equation 3.

LTE/LTE-A RSRP/RSRQ
$$\text{Threshold} \ll S_{MCS\_L} < S_{MCS\_U} < R_{MCS\_L} \quad \text{[Equation 3]}$$

The relay UE may broadcast whether it satisfies the fifth threshold.

If the link quality between the relay UE and BS thereof does not satisfies the fifth threshold even though the D2D link quality between the MCS and the relay UE is excellent, the MCS UE may not select the relay UE and BS thereof as the replacement link.

Figure 14:
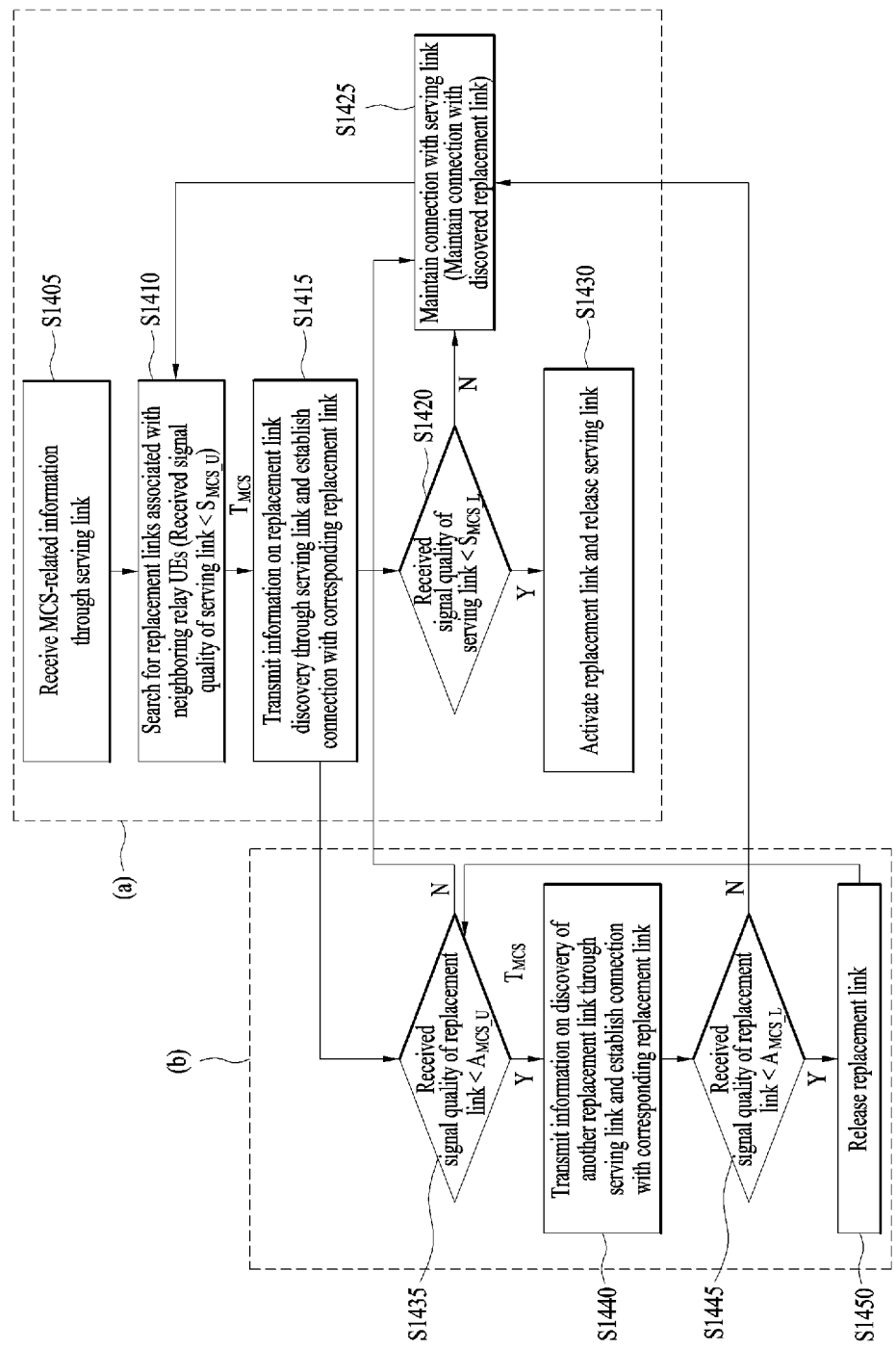
FIG. 14 is a flowchart illustrating a method for discovering a replacement link and updating the replacement link through a relay user equipment according an embodiment of the present invention.

FIG. 14 (a) shows a method for configuring a replacement link using relay UEs according to an embodiment of the present invention.

An MCS UE receives a plurality of pieces of information necessary for providing MCSs [S1405]. For example, the MCS UE receives an MCS-dedicated carrier, an MCS-dedicated carrier used by a relay UE in performing relaying, a serving link quality degradation threshold, a quality degradation threshold related to a relay UE, the maximum number of discoverable serving links, and the maximum number of discoverable replacement links.

When the MCS UE detects that the serving link quality is lower than $S_{MCS\_U}$, the MCS UE searches for a replacement link that can replace the serving link [S1410]. Search targets for the replacement link may be limited to relay UEs capable of D2D communication. The MCS UE may measure link quality with each relay UE. Based on whether link quality between a relay UE and a BS thereof satisfies the fifth threshold, the MCS UE may determine whether to establish the replacement link with the relay UE.

If the relay UE for the replacement link is discovered, the MCS UE reports a search result to a serving link BS and then establishes an RRC connection where unicast data transmission reception is inactivated together with the relay UE [S1415].

The MCS UE determines whether the serving link quality is lower than $S_{MCS\_L}$.

If the serving link quality is lower than $S_{MCS\_L}$, the MCS UE activates an RRC connection via the replacement link and release the RRC connection via the serving link

[S1430]. The MCS UE may determine the activation of the RRC connection of the replacement link itself. Alternatively, the serving link BS may send a request for the activation to a BS connected to a relay UE, which is related to the replacement link.

Figure 15:
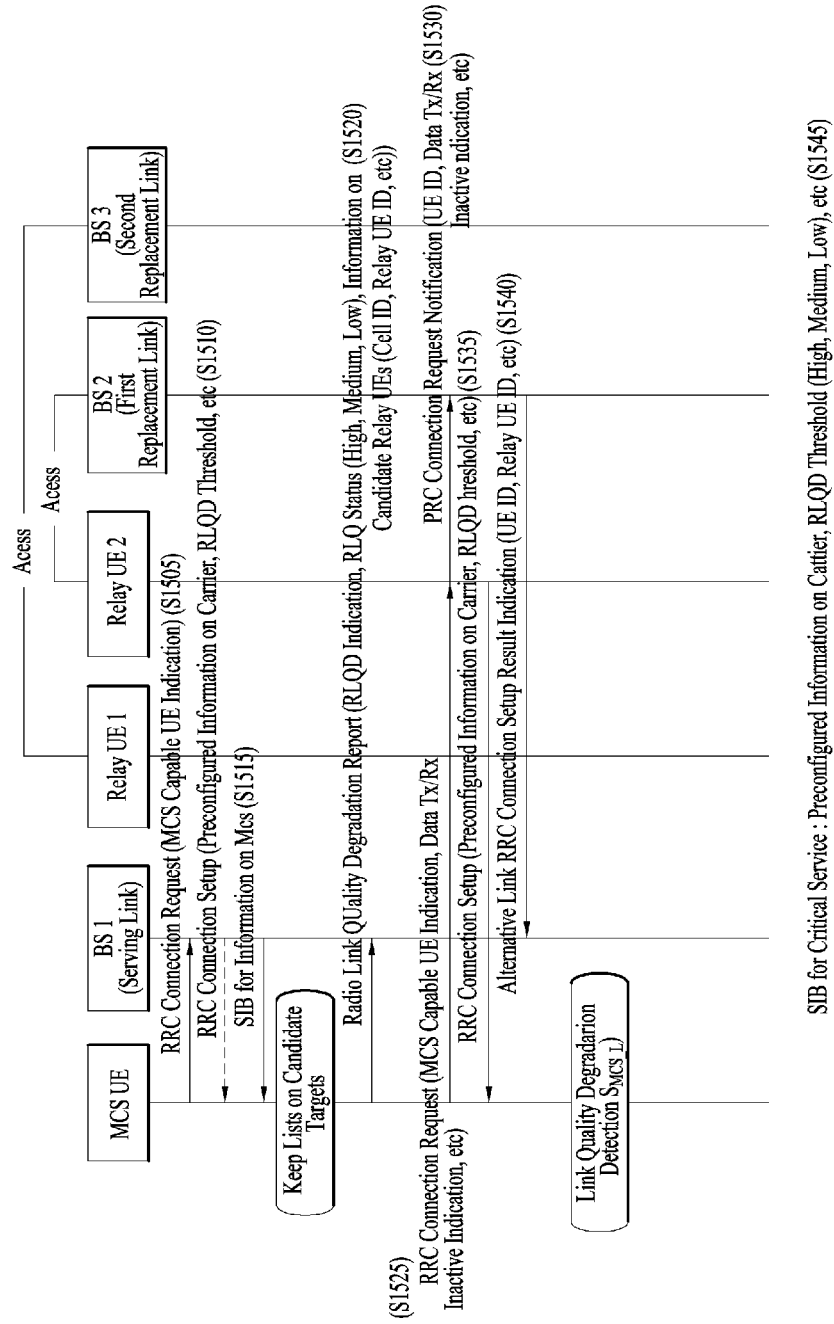
FIG. 15 is a flowchart illustrating a method for discovering a replacement link through a relay user equipment according to an embodiment of the present invention.

FIG. 15 illustrates a process for discovering a replacement link according to an embodiment of the present invention. Overlapping description will be omitted.

An MCS UE transmits an RRC connection request to BS 1 [S1505]. The BS 1 becomes a serving BS of the MCS UE. The RRC connection request includes an indicator indicating that the MCS UE is an MCS capable UE.

The BS 1 transmits an RRC connection setup message to the MCS UE [S1510]. The RRC connection setup message may include information on a carrier dedicated to MCSs, an MCS-dedicated carrier used by a relay UE in performing relaying, an RLQD threshold, and the like. In addition, the RRC connection setup message including an indicator for informing the start and end of an MCS may be transmitted and received between the BS 1 and MCS UE. When the MCS UE informs a serving link BS that the MCS is started, the serving link BS may know that thresholds for MCSs will be applied. On the contrary, when the serving link BS informs the MCS UE that the MCS is started, the MCS UE may know that the thresholds for MCSs will be applied. When the UE informs that the MCS is ended, the serving link BS may know that the thresholds for MCSs will not be applied any more. On the contrary, when the serving link BS informs that the MCS is ended, the MCS UE may know that the thresholds for MCSs will not be applied any more.

When the quality of a serving link is lower than the predetermined threshold ($S_{MCS\_U}$), the MCS UE transmits an RLQD report to the serving link BS [S1520]. Thereafter, the MCS UE starts to discover a replacement link. In this case, the RLQD reports may include the result of the replacement link discovery. In addition, the RLQD report may also include an RLQD indicator indicating that the serving link quality is equal to or lower than the first threshold, RLQ state information indicating that the radio link quality is low, medium, or high, and information on candidate relay UEs associated with the discovered replacement links (e.g., relay UE IDs).

The MCS UE may inform relay UEs that the MCS UE is the MCS capable UE. Each of the relay UEs provides MCS-related information to the MCS UE.

Based on information indicating whether link quality between each relay UE and each BS connected thereto satisfies the fifth threshold, the MCS UE can select a relay UE having the highest link quality with a connected BS. In the present embodiment, it is assumed that the MCS UE selects relay UE 2.

If a replacement link via the relay UE 2 is selected, the MCS UE transmits an RRC connection setup request message to the BS 2 through the relay UE 2 [S1525 and S1530]. The RRC connection setup request message may include an indicator indicating that unicast data transmission and reception is inactivated. The RRC connection setup request message may include information on the serving BS. The MCS UE may transmit, to the relay UE 2, the indicator indicating the start and end of the MCS. When the MCS UE informs the relay UE 2 that the MCS is started, the relay UE 2 may know that the thresholds for MCSs will be applied. When the MCS UE informs that the MCS is ended, the relay UE 2 may know that the thresholds for MCSs will not be applied any more.

The BS 2 transmits an RRC connection setup message to the MCS UE via the relay UE 2 [S1535].

The BS 2 transmits the result of the replacement link establishment to the BS 1 [S1545]. When the serving link quality is degraded, the BS 1 may send a request for replacement link activation to the BS 2.

Maintaining and Updating of Discovered Replacement Link

FIG. 14 (b) illustrates a process for updating a replacement link.

An MCS UE determines whether the quality of a first replacement link via a relay UE is lower than the third threshold ($A_{MCS\_U}$) [S1435].

If the quality of the first replacement link via the relay UE is lower than the third threshold ($A_{MCS\_U}$u), the MCS UE searches for a second replacement link [S540]. Meanwhile, when the quality of a link between the relay UE associated with the first replacement link and a BS connected to the relay UE is lower than the fifth threshold, the MCS UE searches for the second replacement link.

If the second replacement link is discovered, the MCS UE reports to a serving link BS that the second replacement link is discovered, and establishes an RRC connection, where unicast data transmission and reception is inactivated, with a relay UE associated with the second replacement link.

If the MCS UE detects that the quality of the first replacement link is lower than the fourth threshold ($A_{MCS\_L}$) [S1445], the MCS UE release an RRC connection via the first replacement link [S1450]. The MCS UE maintains the RRC connection, where the unicast data transmission and reception is inactivated, with the relay UE associated with the second replacement link.

Figure 16:
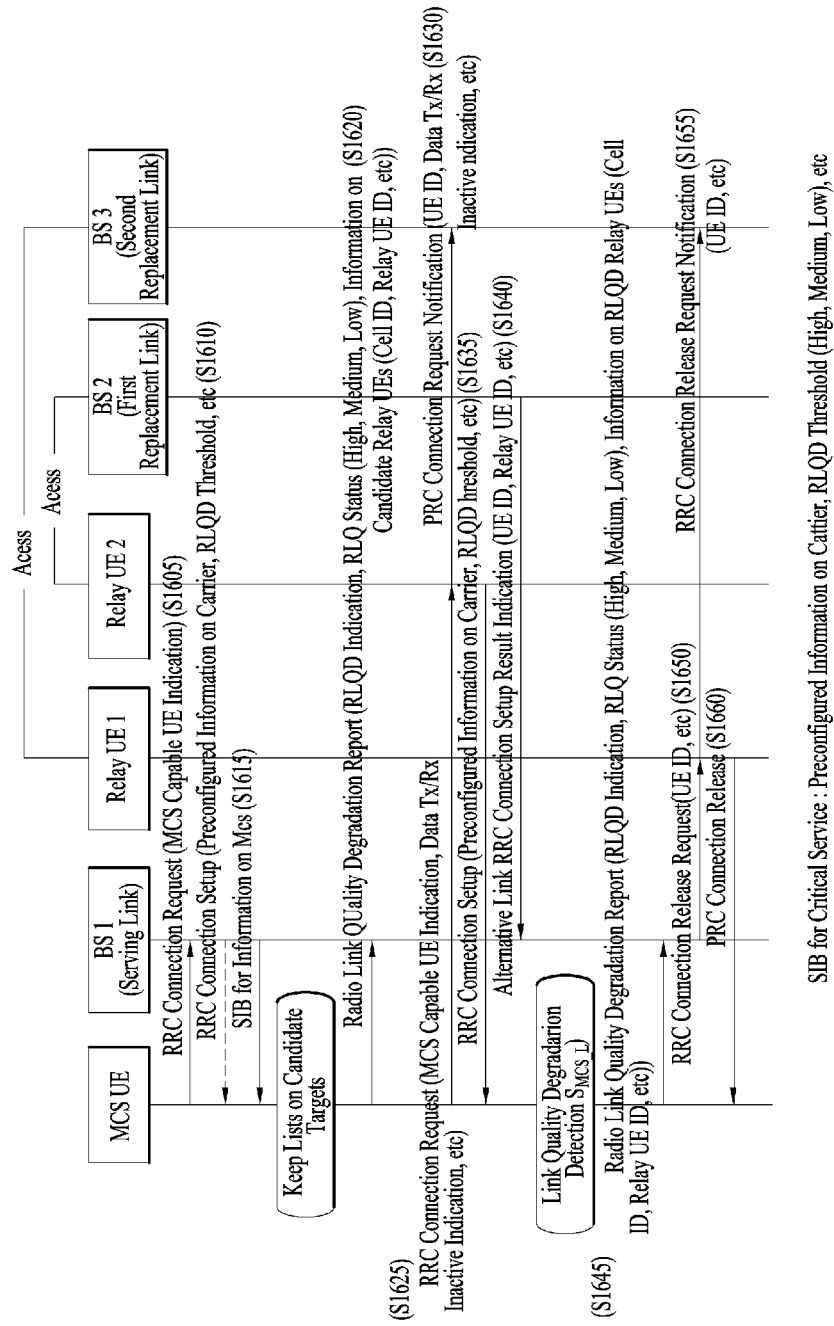
FIG. 16 is a flowchart illustrating a method for updating a replacement link through a relay user equipment according to an embodiment of the present invention.

FIG. 16 illustrates a method for updating a replacement link according to an embodiment of the present invention. Overlapping description will be omitted.

Referring to FIG. 16, an MCS UE transmits an RRC connection request to BS 1 [S1605]. The BS 1 transmits an RRC connection setup message to the MCS UE [S1610]. If the quality of a serving link is equal to or lower than the predetermined threshold ($S_{MCS\_U}$), the MCS UE transmits an RLQD report to the BS 1 [S1620]. If a replacement link via relay UE 1 is discovered, the MCS UE transmits an RRC connection setup request message to BS 3 through the relay UE 1 [S1625 and S1630]. The BS 3 transmits an RRC connection setup message to the MCS UE through the relay UE 1 [S1635]. The BS 3 transmits the result of the replacement link establishment to the BS 1 [S1640].

If the quality of the replacement link via the relay UE 1 is equal to or lower than $A_{MCS\_U}$, the MCS UE searches for a different replacement link via relay UE 2.

If the different replacement link via the relay UE 2 is discovered, the MCS UE transmits the discovery result to the BS 1 [S1645]. The MCS UE establishes an RRC connection, where unicast data transmission and reception is inactivated, via the relay UE 1. If the quality of the replacement link via the relay UE 1 is equal to or lower than $A_{MCS\_L}$, the MCS UE release the RRC connection with the replacement link via the relay UE 1. Otherwise, the MCS UE maintains the replacement link via the relay UE 1.

Figure 17:
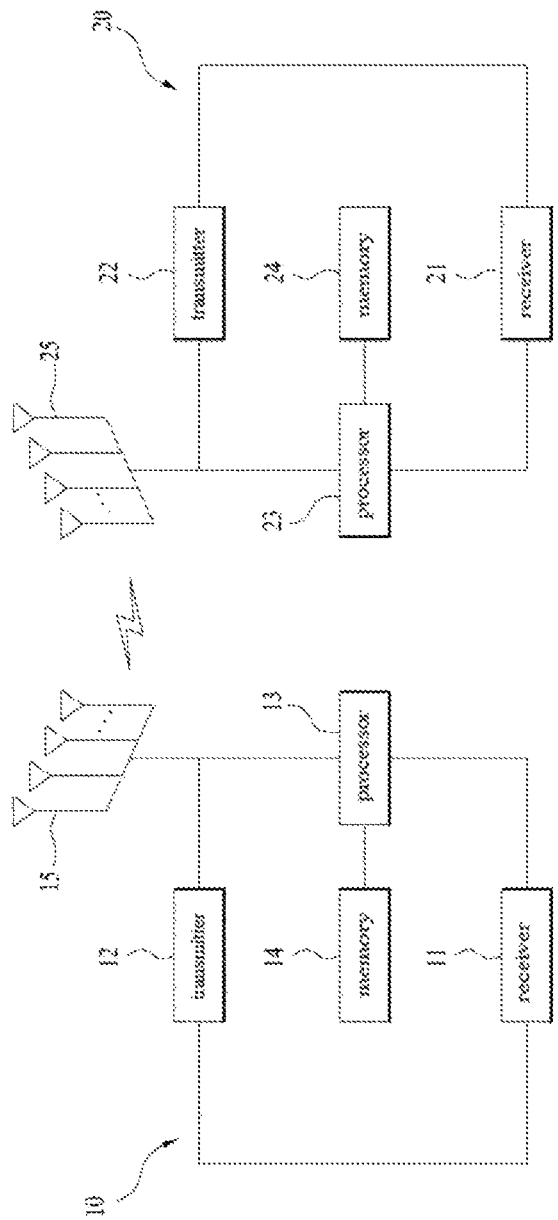
FIG. 17 is a block diagram illustrating a user equipment and a base station according to an embodiment of the present invention.

FIG. 17 is a diagram for structures of a user equipment and a base station according to one embodiment of the present invention. The base station may correspond to a fixed cell or a moving cell. Each of the user equipment and the base station shown in FIG. 17 can perform the aforementioned methods.

Referring to FIG. 17, a base station 10 can include a reception module 11, a transmission module 12, a processor 13, a memory 14 and a plurality of antennas 15. A plurality of the antennas 15 correspond to a base station supporting MIMO transmission and reception. The reception module 11 can receive various signals, data and information from the user equipment in UL. The transmission module 12 can transmit various signals, data and information to the user equipment in DL. The processor 13 can control overall operation of base station 10.

The reception module 13 of the base station 10 may operate as a reception module of a backhaul link or a reception module of an access link. The transmission module 12 may operate as a transmission module of a backhaul link or a transmission module of an access link.

Besides, the processor 13 of the base station 10 performs a function of calculating and processing information received by the base station 10, information to be transmitted to the external and the like. The memory 14 can store processed information for predetermined time and can be replaced with such a configuration element as a buffer (not depicted).

Referring to FIG. 17, a user equipment 20 can include a reception module 21, a transmission module 22, a processor 23, a memory 24 and a plurality of antennas 25. A plurality of the antennas 25 correspond to a user equipment supporting MIMO transmission and reception. The reception module 21 can receive various signals, data and information from the base station in DL. The transmission module 22 can transmit various signals, data and information to the base station in UL. The processor 23 can control overall operation of the user equipment 20.

Besides, the processor 23 of the user equipment 20 performs a function of calculating and processing information received by the user equipment 20, information to be transmitted to the external and the like. The memory 24 can store processed information for predetermined time and can be replaced with such a configuration element as a buffer (not depicted).

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, the embodiments of the present invention are applicable to various kinds of mobile communication systems.

What is claimed is:

1. A method for establishing multiple links through relay user equipments (UEs) by an UE which is out of coverage in a wireless communication system, the method comprising:
   transmitting a radio resource control (RRC) connection request to a temporary relay UE having a highest device-to-device (D2D) signal quality among relay UEs located adjacent to the UE;
   receiving, from the temporary relay UE, an RRC connection setup indicating a first base station (BS) that will provide a serving link to the UE and a second BS that will provide a replacement link to the UE among BSs to which the relay UEs are connected;
   establishing the serving link through a first relay UE by transmitting an RRC connection complete message to the first relay UE connected to the first BS among the relay UEs; and
   establishing the replacement link, where unicast data transmission and reception is inactivated, through a second relay UE connected to the second BS among the relay UEs.

2. The method of claim 1, further comprising:
   broadcasting an out-of-coverage indicator indicating that the UE is out of coverage; and
   receiving, from relay UEs that receive the out-of-coverage indicator, system information including at least one of link quality between the relay UEs and BSs to which the relay UEs are connected, a threshold for link quality degradation, and a number of maximum links that can be established by the UE.

3. The method of claim 2, wherein the RRC connection request includes a list of relay UEs having link quality with BSs to which the relay UEs are connected equal to or higher than the threshold among the relay UEs.

4. The method of claim 1, wherein the first BS is determined based on a load status of each of the BSs to which the relay UEs are connected.

5. The method of claim 1, comprising:
   receiving, from the relay UEs, side-link synchronization signals (SLSSs) allocated to the relay UEs by the BSs to which the relay UEs are connected; and
   synchronizing with the relay UEs based on the SLSSs, wherein the SLSSs are allocated such that each of the SLSSs has a unique value per relay UE.

6. The method of claim 1, further comprising:
when quality of the serving link established through the first relay UE becomes equal to or lower than a threshold, activating the unicast data transmission and reception of the replacement link established through the second relay UE; and
releasing an RRC connection with the serving link established through the first relay UE.

7. The method of claim 1, further comprising:
when quality of the replacement link established through the second relay UE becomes equal to or lower than a first threshold, discovering another replacement link through a third relay UE among the relay UEs; and
when the quality of the replacement link established through the second relay UE becomes equal to or lower than a second threshold, releasing an RRC connection with the replacement link established through the second relay UE.

8. A method for supporting an out-of-coverage user equipment (UE) to establish multiple links by a base station (BSs) to which a temporary relay UE is connected in a wireless communication system, the method comprising:
receiving a radio resource control (RRC) connection request from the out-of-coverage UE through the temporary relay UE;
transmitting a load query request to BSs to which relay UEs are connected based on a list of the relay UEs included in the RRC connection request;
determining a first BS that will provide a serving link to the out-of-coverage UE and a second BS that will provide a replacement link to the out-of-coverage UE based on responses transmitted from the BSs to which the relay UEs are connected in response to the load query request; and
transmitting an RRC connection setup including information indicating the first and second BSs to the out-of-coverage UE through the temporary relay UE,
wherein unicast data transmission and reception is inactivated in the replacement link that will be provided by the second BS.

9. The method of claim 8, wherein the first BS is a BS with a lowest load status among the BSs to which the relay UEs are connected, and wherein the temporary relay UEs is a UE with a highest device-to-device (D2D) signal quality with respect to the out-of-coverage UE among the relay UEs.

10. The method of claim 8, wherein an RRC connection setup complete message, which is transmitted by the out-of-coverage UE in response to the RRC connection setup transmitted by the BS, is received by the first BS that will provide the serving link.

11. The method of claim 8, further comprising:
allocating a side-link synchronization signal, which will be transmitted from the temporary UE to the out-of-coverage UE, to the temporary UE, and
wherein the SLSS allocated to the temporary UE has a unique value different from those of the relay UEs.

12. The method of claim 8, further comprising:
transmitting a multi-link connectivity request including an identifier (ID) of the out-of-coverage UE to each of the first and second BS; and
receiving a multi-link connectivity response indicating whether the multi-link connectivity request is accepted from each of the first and second BS.

13. The method of claim 12, wherein the multi-link connectivity request transmitted to the first BS includes an indicator indicating that the first BS will provide the serving link to the out-of-coverage UE,
wherein the multi-link connectivity request transmitted to the second BS includes an indicator indicating that the second BS will provide the replacement link to the out-of-coverage UE, and
wherein the multi-link connectivity response received from each of the first and second BSs includes an ID of the out-of-coverage UE and a dedicated preamble, which are allocated by each of the first and second BS.

14. A user equipment (UE) which is out of coverage in a wireless communication system, the UE comprising:
a transmitter configured to transmit a radio resource control (RRC) connection request to a temporary relay UE with a highest device-to-device (D2D) signal quality among relay UEs located adjacent to the UE;
a receiver configured to receive, from the temporary relay UE, an RRC connection setup indicating a first base station (BS) that will provide a serving link to the UE and a second BS that will provide a replacement link to the UE among BSs to which the relay UEs are connected; and
a processor configured to establish the serving link through a first relay UE by transmitting an RRC connection complete message to the first relay UE connected to the first BS among the relay UEs and establish the replacement link, where unicast data transmission and reception is inactivated, through a second relay UE connected to the second BS among the relay UEs.

15. A base station (BS) for supporting an out-of-coverage user equipment (UE) to establish multiple links in a wireless communication system, the BS comprising:
a receiver configured to receive a radio resource control (RRC) connection request from the out-of-coverage UE through a temporary relay UE connected to the BS;
a transmitter configured to transmit a load query request to BSs to which relay UEs are connected based on a list of the relay UEs included in the RRC connection request; and
a processor configured to determine a first BS that will provide a serving link to the out-of-coverage UE and a second BS that will provide a replacement link to the out-of-coverage UE based on responses transmitted from the BSs to which the relay UEs are connected in response to the load query request, and
wherein unicast data transmission and reception is inactivated in the replacement link that will be provided by the second BS.

* * * * *